US008538619B2

(12) United States Patent
Syed et al.

(10) Patent No.: US 8,538,619 B2
(45) Date of Patent: *Sep. 17, 2013

(54) ADAPTIVE REAL-TIME DRIVER ADVISORY CONTROL FOR A HYBRID ELECTRIC VEHICLE TO ACHIEVE FUEL ECONOMY IMPROVEMENT

(75) Inventors: Fazal Urrahman Syed, Canton, MI (US); Dimitar Petrov Filev, Novi, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,074

(22) Filed: May 21, 2012

(65) Prior Publication Data

US 2012/0245775 A1    Sep. 27, 2012

Related U.S. Application Data

(62) Division of application No. 12/796,038, filed on Jun. 8, 2010, now Pat. No. 8,190,319.

(51) Int. Cl.
*G06F 7/00* (2006.01)
(52) U.S. Cl.
USPC .......................................................... 701/22
(58) Field of Classification Search
USPC ........... 701/22, 54, 55, 57, 58, 59, 70, 77–80, 701/83, 98, 99, 123, 33.1, 33.4
See application file for complete search history.

(56) References Cited

U.S. PATENT DOCUMENTS

| 6,092,021 | A  | 7/2000 | Ehlbeck et al. |
| 6,553,301 | B1 | 4/2003 | Chhaya et al. |
| 6,925,425 | B2 | 8/2005 | Remboski et al. |
| 7,024,306 | B2 | 4/2006 | Minami et al. |
| 7,072,762 | B2 | 7/2006 | Minami et al. |
| 7,079,018 | B2 | 7/2006 | Hottebart et al. |
| 7,444,311 | B2 | 10/2008 | Engstrom et al. |
| 8,190,319 | B2 * | 5/2012 | Syed et al. ............... 701/22 |
| 2007/0276582 | A1 | 11/2007 | Coughlin |

(Continued)

FOREIGN PATENT DOCUMENTS

| DE | 19733464 A1 | 2/1998 |
| DE | 10024231 A1 | 11/2001 |

(Continued)

OTHER PUBLICATIONS

Singapore Car Blog, http://www.sgcarmart.com/news/article/php?AID=1648, Honda develops Ecological Drive Assist Sytem for Enhanced real world fuel economy, Jun. 7, 2010.

(Continued)

*Primary Examiner* — Kim T Nguyen
(74) *Attorney, Agent, or Firm* — David B. Kelley; Brooks Kushman P.C.

(57) ABSTRACT

A vehicle powertrain controller includes a fuzzy logic-based adaptive algorithm with a learning capability that estimates a driver's long term driving preferences. An adaptive algorithm arbitrates competing requirements for good fuel economy, avoidance of intrusiveness and vehicle drivability. A driver's acceptance or rejection of advisory information may be used to adapt subsequent advisory information to the driving style. Vehicle performance is maintained in accordance with a driver's driving style.

14 Claims, 3 Drawing Sheets

(56) References Cited

U.S. PATENT DOCUMENTS

| | | |
|---|---|---|
| 2008/0042489 A1 | 2/2008 | Lewis et al. |
| 2008/0120175 A1 | 5/2008 | Doering |
| 2009/0043467 A1* | 2/2009 | Filev et al. .................... 701/57 |

FOREIGN PATENT DOCUMENTS

| | | |
|---|---|---|
| JP | 2002370560 A | 12/2002 |
| JP | 2003335151 A | 11/2003 |
| JP | 2007076468 A | 3/2007 |
| JP | 2007182196 A | 7/2007 |
| WO | 2008128416 A1 | 10/2008 |

OTHER PUBLICATIONS

ScienceDirect—Control Engineering Practice: Design of genetic-fuzzy control strategy for parallel hybrid electric vehicles, http://www.sciencedirect.com/science?_ob=ArticleURL&_udi=B6V2H-4R70r91-1&_user, vol. 16, Issue 7, Jul. 2008, pp. 861-873.

SAE International Technical Papers, Intelligent Control of Hybrid Vehicles Using Neural Networks and Fuzzy Logic, published Feb. 23, 1998, Authors: Bernd Baumann, Gregory Washington, Giorgio Rizzoni.

* cited by examiner

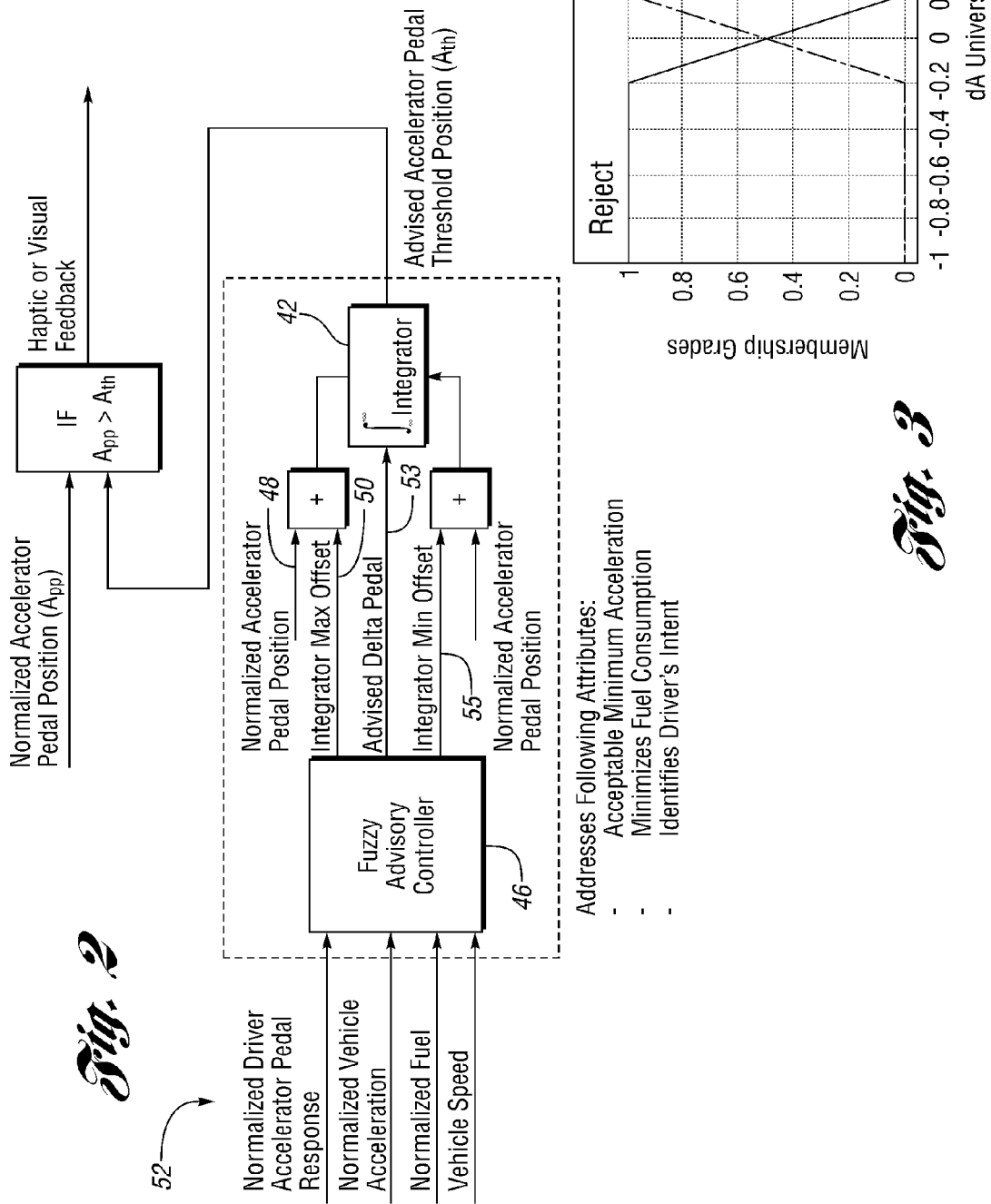

ADAPTIVE REAL-TIME DRIVER ADVISORY CONTROL FOR A HYBRID ELECTRIC VEHICLE TO ACHIEVE FUEL ECONOMY IMPROVEMENT

CROSS-REFERENCE TO RELATED APPLICATIONS

This application is a division of U.S. application Ser. No. 12/796,038 filed Jun. 8, 2010, now U.S. Pat. No. 8,190,319 granted May 29, 2012, the disclosure of which is incorporated in its entirety by reference herein.

BACKGROUND

A hybrid electric vehicle relies upon two power sources for delivering power to vehicle traction wheels. One power source typically is an internal combustion engine and the other power source is a battery and a motor, together with a generator. In a so-called power-split hybrid electric vehicle powertrain, a generator is mechanically coupled to the engine and is electrically coupled to the battery and the motor. For example, in U.S. Pat. No. 7,467,033, a split power delivery path is established by a simple planetary gear unit whereby the generator is connected drivably to the sun gear of the planetary gear unit and the engine is connected to the carrier of the planetary gear unit. The ring gear of the planetary gear unit is mechanically connected to the motor. Although a split power hybrid electric vehicle powertrain is capable of embodying the present invention, other types of hybrid electric vehicle powertrain architectures may embody the invention as well, including non-hybrid powertrains in which an internal combustion engine is a power source.

Although known hybrid electric vehicle powertrains provide a significant improvement in overall powertrain fuel economy and reduce undesirable exhaust gas emissions compared to conventional powertrains, there is a potential for still further improvement in fuel economy by making adjustments in factors such as driver style, driver behavior and driver preferences. This may be done by providing appropriate feedback to the driver with regard to adjustments that affect fuel economy. The feedback may be in the form of visual indicators or displays.

A hybrid powertrain typically includes a vehicle control system that coordinates power distribution from each power source to achieve an optimum balancing of torque, speed and power from each power source. The control system includes an engine controller, a transmission controller, a high voltage battery controller, a regenerative braking system, and a high voltage battery. A vehicle system controller performs an overall vehicle system coordination and oversight by communicating with several subsystem controllers. The vehicle system controller manages and coordinates the driveline functions to satisfy the driver's torque request and to balance energy flow to and from the subsystems. A real-time advisory system can provide direct advice to drivers regarding optimal accelerator pedal and brake pedal inputs to the vehicle system controller.

SUMMARY

The invention includes a real-time driver advisory system using a fuzzy logic-based adaptive algorithm with a learning strategy that estimates a driver's long-term and short-term driving preferences. The algorithm is used to provide a significant advancement in the capability of known non-adaptive real-time fuel economy advisory systems, which include visual and haptic feedback information to the driver so that the driver can change driving style or behavior for a given vehicle condition to improve fuel economy. Applicants' algorithm is tuned to maximize fuel economy without significantly affecting performance of the vehicle and without being intrusive for the driver. The algorithm learns driver intentions by monitoring driving style and driver behavior, and it addresses the issue of intrusiveness due to the advisory feedback. This balances the competing requirements for improved fuel economy and drivability by maintaining vehicle performance acceptable to a driver's learned driving style and behavior while providing a mechanism for improving fuel economy.

A driver request for power at the traction wheels is conveyed by the advisory system to the controller by monitoring an accelerator pedal and a brake pedal. The request level and profile can affect fuel economy in an electric vehicle in which there is more than one energy source. Based on driver traction torque requests, different operating modes of a hybrid electric vehicle can be selected. That selection may or may not be optimal for achieving optimal fuel efficiency.

The controller of the present invention uses input variables, output variables and associated fuzzy rule sets to make certain that the driver's selection of an operating mode will be optimal for achieving best fuel efficiency. The controller takes into account drivability and fuel consumption, together with an essence of prediction, and takes advantage of opportunistic conditions.

The adaptive algorithm of the invention is capable of improving driver behavior and driving style without being perceived as ineffective or intrusive while achieving fuel economy improvement.

To identify fuel consumption and vehicle driving state, the powertrain inputs used are normalized fuel consumption ($fc_n$) and vehicle speed (vs). To address the criteria for acceptable drivability or performance (the vehicle should be able to achieve minimum acceptable acceleration at all times), one of the other inputs that is used is the normalized vehicle acceleration ($a_n$). To predict the driver's behavior and make use of opportunistic states of the driving behavior, the driver pedal response ($\zeta_{AA}$), is used as the final input.

The outputs of the controller are the advised change (delta) of the accelerator pedal position ($\Delta A_{u\_lim}$) together with two other outputs; i.e., a maximum integrator offset ($I_{oft\_max}$) and a minimum integrator offset ($I_{oft\_min}$). This advised change of accelerator pedal position is fed into an integrator to obtain an advised accelerator pedal threshold ($A_{th}$), which is limited to lower and upper bounds. These lower and upper bounds are calculated based on actual pedal position, minimum integral offset, and maximum integral offset. The advised accelerator pedal threshold, $A_{th}$, is used as a threshold to compare the advised accelerator pedal position to actual accelerator pedal position, $A_{pp}$, such that if $A_{pp}$ is greater than $A_{th}$, then a feedback signal (haptic or visual) can be sent to the driver indicating that a condition exists where fuel economy of the vehicle can be improved by decreasing the acceleration pedal position, $A_{pp}$.

BRIEF DESCRIPTION OF THE DRAWINGS

FIG. 2 is a schematic block diagram of a fuzzy advisory controller for the powertrain of FIG. 1.

FIG. 3 is a diagram of membership functions for the fuzzy controller of FIG. 2 wherein the membership functions are characterized as being in "accept" and "reject" categories.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
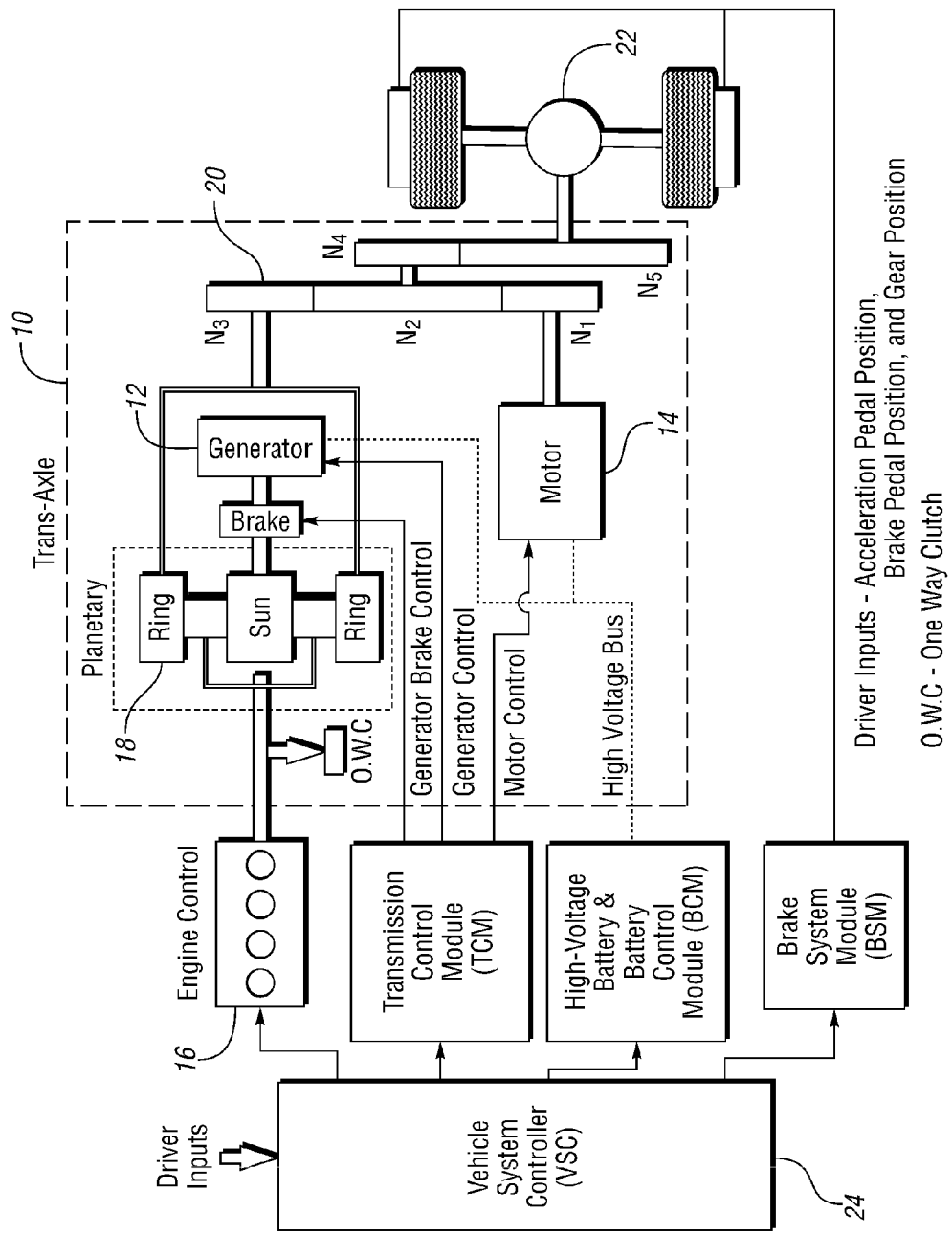
FIG. 1 shows a schematic representation of a power-split hybrid electric vehicle powertrain capable of embodying the invention.

FIG. 1 shows in schematic form a power-split hybrid electric vehicle powertrain that is capable of embodying the improved control system of the invention. FIG. 1 shows a transaxle 10, which includes two electric machines, a generator 12 and a motor 14, together with an engine 16. A planetary gear unit 18 provides a mechanical split power delivery path from the engine to torque transfer gearing, which delivers driving torque to an axle and differential assembly for vehicle traction wheels, as shown at 22. A coordinated vehicle control system for managing the power distribution from each of the power sources to the traction wheels is provided. This coordination requires control algorithms to perform the balancing of torque speed and power from the two power sources.

The control system includes an controller for engine 16, a transmission control module (TCM), a high voltage battery and battery control module (BCM) and a regenerative braking system (BSCM) to control the engine, the transaxle, the battery and a regenerative braking subsystem, respectively. A vehicle system controller (VSC) performs an overall vehicle assessment and coordinated control by communicating with the subsystem controllers. It manages and coordinates the powertrain functions to satisfy a driver's power request, and balances the energy flow to and from the multiple subsystems. The present invention will use a driver behavior variable since that variable plays a significant role in achieving maximum vehicle fuel economy and reducing vehicle exhaust emissions. A real-time advisory system, using the present invention, can provide direct advice to drivers regarding the optimal operation of the accelerator pedal and the brake pedal inputs to help the driver improve fuel economy without using commands that are intrusive.

The fuzzy advisory controller is a main component of the adaptive advisory system. It uses a set of rules with fuzzy predicates and an approximate reasoning method, as seen in Table 1 in the subsequent description, to summarize essentially a strategy that accounts for instantaneous fuel consumption, vehicle speed, vehicle acceleration, and the driver's torque request, in order to determine the upper bound of the torque request that accounts for maximum fuel efficiency and drivability. The controller-calculated torque upper bound profile is a dynamic threshold for the accelerator pedal position, which is used as an advisory warning for fuel economy cautious drivers. Its input variables consist of normalized (scaled) values of the fuel consumption ($f_{cn}$ or $x_1$), vehicle speed ($v_s$ or $x_2$), vehicle acceleration ($a_n$ or $x_3$), and driver accelerator pedal response pedal ($\Delta A_{pp}$ or $x_4$).

The main output of the controller is the advised change of the pedal position ($\Delta A_{u\_lim}$ or $y_1$). This advised change of accelerator pedal position is integrated to obtain an advised accelerator pedal threshold position ($A_{th}$) that is further compared to the actual accelerator pedal position $A_{pp}$. In the cases when $A_{pp}$ is greater than $A_{th}$, a feedback (using haptic or visual human-machine interface HMI) is sent to the driver indicating that a condition exists where fuel economy of the vehicle can be improved by decreasing the accelerator pedal position, App; i.e., by reducing the instantaneous torque request.

In addition to the main output of the advised change of the pedal position, $y_1$, the fuzzy advisory controller includes two extra outputs that are not common in conventional fuzzy logic controllers. These additional outputs, seen in FIG. 2, are the maximum integrator offset 50 ($I_{oft\_max}$ or $y_2$) and the minimum integrator offset 53 ($I_{oft\_min}$ or $y_3$). The two additional outputs dynamically adjust the lower ($A_{pp}+y_3$) and upper ($A_{pp}+y_2$) bounds of the advised accelerator pedal threshold position to the current operating point as defined by the actual pedal position. The purpose of these adjustable bounds is to avoid the integral windup and associated effects of saturation, consequent overshoots and undesirable transients. FIG. 2 shows this fuzzy advisory controller. This fuzzy controller utilizes the human expert control knowledge and experience in vehicle driving to intuitively construct a strategy that emulates a desired driving behavior.

In order to introduce the rule-base model describing the input-output relationships in the controller, the input and output variables are partitioned into fuzzy subsets. The input variables of the controller are partitioned into two fuzzy subsets each (low or $F_{i,L}$ and high or $F_{i,H}$), i=[1,4]) in order to better describe the input—output logical relationship. The input fuzzy subsets are formalized by trapezoidal functions. The integrator offset output variables are partitioned into three fuzzy subsets—high or $h_{2H}$, low or $h_{2L}$, and zero or $h_{2Z}$ for the minimum integrator offset while the advised change of accelerator pedal position is quantified into four subsets: high or $h_{1H}$, low or $h_{1L}$, negative low or $h_{1L}$, and negative high or $-h_{1H}$. All output fuzzy subsets are fuzzy singletons. The partitioning of the input-output variables decomposes the space of the main factors that affect vehicle fuel economy and performance (instantaneous fuel consumption, acceleration, speed, and accelerator pedal position) and is the foundation of a rule-based model of the advisory strategy.

TABLE 1

Rule-base of the advanced MIMO fuzzy advisory controller

| | Antecedents | | | | Consequents | | | |
|---|---|---|---|---|---|---|---|---|
| Rule No. | If $\Delta A$ is | If vs is | If $a_n$ is | If $fc_n$ is | Then $\Delta A_{u\_lim}$ is | Then $I_{oft\_max}$ is | Then $I_{oft\_min}$ is | Conditions |
| 1 | Low | Low | Low | Low | High | High | Zero | Steady state efficient driving condition |
| 2 | Low | Low | Low | High | Low | Low | Zero | Steady state opportunistic condition where fuel |

TABLE 1-continued

Rule-base of the advanced MIMO fuzzy advisory controller

| Rule No. | Antecedents | | | | Consequents | | | Conditions |
|---|---|---|---|---|---|---|---|---|
| | If $\zeta\Delta A$ is | If vs is | If $a_n$ is | If $fc_n$ is | Then $\Delta A_{u\_lim}$ is | Then $I_{oft\_max}$ is | Then $I_{oft\_min}$ is | |
| 3 | Low | Low | High | Low | Low | High | Zero | consumption is high, so indicate that driving behavior is fine and prepare outputs to look for opportunity to improve efficiency Almost steady state condition where vehicle acceleration is high, but fuel consumption low, so indicate to driver that driving style is fine. |
| 4 | Low | Low | High | High | −Low | Zero | −Low | Almost steady state condition where vehicle acceleration & fuel consumption is high, so take slow corrective action by indicating (after some delay) to driver that he/she needs to slow down. |
| 5 | Low | High | Low | Low | High | High | Zero | Steady state efficient driving condition. |
| 6 | Low | High | Low | High | Low | Low | Zero | Steady state opportunistic condition where fuel consumption is high, so indicate that driving style is fine and prepare to look for opportunity to improve efficiency |
| 7 | Low | High | High | Low | Low | High | Zero | Almost steady state condition where vehicle acceleration is high, but fuel consumption low, so indicate to driver that driving style is fine. |
| 8 | Low | High | High | High | −High | Zero | −High | Almost steady state condition where vehicle acceleration & fuel consumption is high, so take fast corrective action by indicating to driver that he/she needs to slow down. |
| 9 | High | Low | Low | Low | −Low | High | Zero | Transient predictive condition where current conditions are fine, but due to the faster driver response, use predictive actions to prepare for any upcoming inefficiency. |
| 10 | High | Low | Low | High | −Low | Low | Zero | Transient predictive condition where current conditions are not efficient, so slowly prepare to indicate to driver to decrease pedal after transient event is over. |
| 11 | High | Low | High | Low | High | Low | Zero | Transient efficient driving condition. |
| 12 | High | Low | High | High | −High | Low | Zero | Transient predictive condition where current conditions are not efficient, and quickly prepare to indicate to driver to decrease pedal after transient event is over. |
| 13 | High | High | Low | Low | −Low | Low | Zero | Transient predictive condition where current conditions are not efficient, so slowly prepare to indicate to driver to decrease pedal after transient event is over. |
| 14 | High | High | Low | High | −High | Low | Zero | Transient opportunistic condition where current conditions are not efficient, and quickly prepare to indicate to driver to decrease pedal after transient event is over. |

TABLE 1-continued

Rule-base of the advanced MIMO fuzzy advisory controller

| | Antecedents | | | | Consequents | | | |
|---|---|---|---|---|---|---|---|---|
| Rule No. | If ζΔA is | If vs is | If $a_n$ is | If $fc_n$ is | Then $\Delta A_{u\_lim}$ is | Then $I_{oft\_max}$ is | Then $I_{oft\_min}$ is | Conditions |
| 15 | High | High | High | Low | Low | Low | Zero | Transient condition where current conditions are almost efficient |
| 16 | High | High | High | High | −Low | Zero | −Low | Transient condition where current conditions are not efficient, so slowly (after some delay) indicate to driver to decrease pedal. |

Vector $y = [y_1 \; y_2 \; y_3]$ of deterministic values of the three outputs of the advisory fuzzy controller is inferred by applying the simplified method of reasoning on the set of 16 rules in Table 1:

$$y = \frac{\sum_j F_{1,j_1}(x_1) F_{2,j_2}(x_2) F_{3,j_3}(x_3) F_{4,j_4}(x_4)[h_{1,k_1} h_{2,k_2} h_{3,k_3}]}{\sum_j F_{1,j_1}(x_2) F_{2,j_2}(x_2) F_{3,j_3}(x_3) F_{4,j_4}(x_4)} \quad (1)$$

where $j_s = \{\text{Low, High}\}$ for $s = [1,4]$, $k_1 = \{\text{High, Low, −High, −Low}\}$, $k_2 = \{\text{High, Low, Zero}\}$, and $k_3 = \{\text{Zero, −Low, −High}\}$ represents the vector of the three outputs and $F_{i,j_i}(x_i)$ is the degree of firing (matching) the antecedent $F_{i,j_i}$ membership function by the normalized input $x_i$. The output of the complete fuzzy controller system after the integration of the output $y_l$ can be described by the following equation:

$$u(n) = \begin{cases} A_{pp} + y_2, & \text{if } u_{tmp} > (A_{pp} + y_2) \\ u_{tmp} = \int_0^t y_1(\tau) dt, & \text{if } (A_{pp} - y_3) \leq u_{tmp} \leq (A_{pp} + y_2) \\ A_{pp} - y_3, & \text{if } u_{tmp} < (A_{pp} - y_3) \end{cases} \quad (2)$$

where, $$0 \leq A_{pp} + y_2 \leq A_{pp} - y_3 \leq 1 \quad (3)$$

Substituting the values of $y_1$, $y_2$ and $y_3$ into equation (2) results in the following:

$$A_{th} = \begin{cases} A_{pp} + \dfrac{\sum_j F_{1,j_1}(x_1) F_{2,j_2}(x_2)}{F_{3,j_3}(x_3) F_{4,j_4}(x_4) h_{2,k_2}} \\ \quad \quad F_{3,j_3}(x_3) F_{4,j_4}(x_4) & \text{if } u_{tmp} > (A_{pp} + y_2) \\[6pt] u_{tmp} = \int \dfrac{\sum_j F_{1,j_1}(x_1) F_{2,j_2}(x_2)}{F_{3,j_3}(x_3) F_{4,j_4}(x_4) h_{1,k_1}} dt, & \text{if } (A_{pp} - y_3) \leq u_{tmp} \leq (A_{pp} + y_2) \\[6pt] A_{pp} + \dfrac{\sum_j F_{1,j_1}(x_1) F_{2,j_2}(x_2)}{F_{3,j_3}(x_3) F_{4,j_4}(x_4) h_{3,k_3}} \\ \quad \quad F_{3,j_3}(x_3) F_{4,j_4}(x_4) & \text{if } u_{tmp} > (A_{pp} - y_3) \end{cases} \quad (4)$$

where $A_{th}$ is the advised accelerator pedal position threshold, which if followed, will result in fuel economy improvement as defined by the rule-base in Table 1. This advice can be provided through various mechanisms, such as a haptic mechanism where a vibrating motor is mounted on the accelerator pedal; or a visual mechanism where the instrument cluster displays advice through a visual HMI (human-machine interface).

The fuzzy partitioning and the rule-base are used to formalize the expert defined strategy advising for fuel efficient driving. The approximate reasoning mechanism (1)-(4) transforms the rule-base into a nonlinear multiple-input, multiple-output (MIMO) nonlinear mapping of the advisory controller.

The real time advisory controller is a fuzzy rule based controller that uses key driver and vehicle related inputs together with a fuzzy rules base to provide feedback to the driver so fuel economy of the vehicle can be improved.

While this real-time advisory controller with its rules base maximizes fuel economy without significantly affecting impacting the performance of the vehicle, drivers with different types of driver styles, such as soft, normal or aggressive, may perceive the feedback differently. For example, on one extreme, some drivers may find this feedback to be intrusive based on their driving styles. Even with the potential for increasing fuel economy, this feedback or advice, which results in reduced performance, can be unacceptable to such drivers. On the other hand, another group of drivers may consider this feedback to well fit to their driving style and preferences for fuel economy vs. performance. Hence an adaptive algorithm that can learn driver intentions by monitoring their driving style and behavior can be used to address these issues. Therefore, the objective of this algorithm is to use the estimated driver characterization to dynamically adapt the parameters of the fuzzy advisory controller (Table 1) to the specific driver and improve its effectiveness.

The adaptive algorithm continually monitors the reaction of the driver to the recommendation of the advisory system (haptic signal) and estimates driver preferences for performance vs. fuel economy. The main idea behind the adaptive advisory algorithm is that if the feedback mechanism is not of driver's desire, his or her accelerator response or behavior will indicate this fact.

From the perspective of the advisory feedback algorithm, two categories of a driving style can be defined. The first category is characterized, in general, with acceptance of the recommendations of the advisory system. Since the advisory algorithm is designed to improve fuel economy, this category can be associated with "fuel efficiency aware style" of driving. The second category represents driving style that, most of the time, rejects or ignores the recommendations of the advisory system. Similarly, this category can be associated with "performance oriented style" of driving. The driving style is characterized rather than the driver, assuming that specific goals, driving conditions, load, driver's cognitive/emotional state, etc., may cause a certain driver to exhibit different driving styles under different circumstances.

Numerically, the acceptance or rejection of the advisory system recommendations can be quantified through the difference ($dA=A_{th}-A_{pp}$) between the advised and the actual pedal position. Since the evaluation of the driving style with respect to the recommendations of the advisory system is not well defined and is subjective, fuzzy subsets are used to quantify the two categories of driving styles. Those categories are evaluated using probabilities based on the specific driver actions. The fuzzy subsets associated with the categories of acceptance/rejection are described by the following membership functions $\mu_a(dA_n)$ and $\mu_r(dA_n)$ defined over the dA universe [−1, 1]. FIG. 3 shows the relationship between the degrees of membership for those two categories over the universe [−1, 1] of all possible combinations $A_{th}$ and $A_{pp}$.

The membership functions in FIG. 3 can be assigned to any event that is represented by a specific $dA_k$ using a two dimensional vector, $L_n=[\mu_a(dA_n), \mu_r(dA_n)]'$, representing its degrees of membership to each of the Accept/Reject categories. For example, $dA_n=0.2$ will translate to the degrees of membership to the Accept and Reject categories: $\mu_a(0.2)=0$; $\mu_r(0.2)=1$.

The vector of membership values $L_0(n)$ makes the association between a single driving event and the possible driver characterization with respect to that event. In order to characterize the long term behavior of the driver we need an interpretation using probabilities that are generated by multiple events. By adding the membership values for each event, an aggregation of the overall, possibilities is made whereby the driving style can be categorized as acceptance/rejection:

$$L = \sum_{n=1}^{N} [\mu_a(dA_n), \mu_r(dA_n)]' \quad (5)$$

where N is the total number of samples. The aggregated possibilities can be considered as frequencies (sometimes referred to as fuzzy frequencies) since they reveal how frequently and to what degree the driver's actions can be cascaded to the two categories.

The alternative to aggregating the possibilities, i.e. adding the membership functions, is to add 1 if the specific membership grade is greater than a prescribed threshold value, e.g. 0.9, or 0 otherwise, resulting in calculating the conventional frequencies of the categories.

From the aggregated possibilities we can calculate the probabilities of the acceptance/rejection categories: $p_i=L_i/(L_1+L_2)$; $i=1, 2$.

The probabilities $p_i$'s are calculated from the aggregated possibilities (fuzzy frequencies) and can be considered as the "fuzzy" probabilities. The reason for the fuzziness here is the lack of certainty in characterizing the relationship between the two categories. For the special case of crisply defined categories (represented by intervals rather than fuzzy subsets) the possibilities transform to Boolean values, and their aggregated values become frequencies. Consequently the "fuzzy probabilities" $p_i$'s are translated to the conventional probabilities.

The frequencies based calculation of the probabilities $p_i$'s can be formally expressed in terms of the average frequencies $p_i=(L_i/N)/(L_1/N+L_2/N)$ $i=1, 2$.

Alternatively, the average frequencies can be replaced by their exponentially weighted average counterparts where the higher weights are assigned to the possibilities that are associated with the most recent events. Numerically, the process of generating a weighted average with higher weights corresponding to the recent observation can be accomplished by applying a low pass filter implementing the exponential smoothing algorithm in the time domain as follows:

$$L(n)=FL(n-1)+(1-F)L_0(n), \quad (6)$$

where the constant forgetting factor, $0<F\leq1$, controls the rate of updating the mean L* by assigning a set of exponentially decreasing weights to the older observations. For a constant forgetting factor (F), a vector of positive weights (W) with unit sum is obtained:

$$W=[F^n(1-F)F^{n-1}(1-F)F^{n-2}\ldots(1-F)] \quad (7)$$

Vector W delineates a weighted average type aggregating operator with exponentially decreasing weights that are parameterized by the forgetting factor F. Parameter α defines the memory depth (the length of the moving window) of the weighted averaging aggregating operator. It can be shown that the memory depth $K_F$ is approximately reciprocal to the forgetting factor, i.e. $K_F=1/(1-F)$. Therefore, the low pass filtered value L*(n) of the membership grade vector represents the weighted averages of the individual possibilities over the weights W. Since all of the aggregated possibilities are calculated over the same moving window of a length of $K_F=1/(1-F)$, we can consider them as representations of the frequencies of the associations with each of the two categories. Weighted average is calculated over the events with indexes belonging to a soft interval: $s \in \{n-K_F+1, n\}$; where symbol { indicates a soft lower bound that includes values with lower indexes than $(n-K_F)$ with relatively low contribution. Consequently, the aggregated possibilities that form the vector L can be converted to probabilities.

By manipulating the forgetting factor or making it dependent on certain conditions, we essentially change the moving window length and obtain long or short term acceptance/rejection categories of the driver's preferences.

Numerically, the process of characterization of the driver's style can be significantly simplified if the fuzzy partitioning in FIG. 3 is replaced by partitioning into two disjoint intervals. In this case it is enough to characterize only one of the categories. For instance, if the rejection category is characterized we get:

$$L(n)=FL(n-1)+(1-F)1 \text{ if } A_{pp}>A_{th} \quad (8a)$$

$$L(n)=FL(n-1) \text{ otherwise} \quad (8b)$$

For different values of the forgetting factor F we learn different characterizations of the driver style. This simplification, however, has an impact on the accuracy of the learned information about the driver; e.g., small and large values of $dA=A_{th}-A_{pp}$ are interpreted identically in (8a).

The simplified learning based characterization of the driving style is defined by equations (8a) and (8b). Slow and fast directional forgetting factors are used to learn both long term and short term driver behaviors respectively.

The framework of the learning control methodology is as follows:

M1) Determine conditions for using learning mechanism: In this step, the learning mechanism is activated under acceptable driving conditions, such as acceptable accelerator pedal position, acceptable vehicle speed, and acceptable acceleration.

M2) Determine the long term characterization of the driving style $L_s$. In this step, a slow forgetting factor based learning of the rejection category is determined as follows:

M2-a) When the accelerator pedal position is increasing or $\Delta A_{pp}$ is positive, the slow forgetting factor, $F_s$, is determined as follows:

$$F_s=F_{sp}, \quad (9)$$

where $F_{sp}$ is the slow forgetting factor value when the accelerator pedal position is increasing or $\Delta A_{pp}$ is positive, M2-b) When the accelerator pedal position is decreasing or $\Delta A_{pp}$ is negative, the slow forgetting factor, $F_s$, is determined as follows:

$$F_s=F_{sn}, \quad (10)$$

where $F_{sn}$ is the slow forgetting factor value when the accelerator pedal position is decreasing or $\Delta A_{pp}$ is negative.

M2-c) When the accelerator pedal position, $A_{pp}$, is less than or equal to the $A_{th}$, then the long term characterization of the driving style $L_s$, is determined as follows (4ii):

$$L_s(n)=F_sL_s(n-1) \quad (11)$$

M2-d) When the accelerator pedal position, $A_{pp}$, is greater than the $A_{th}$, then the long term characterization of the driving style $L_s$, is determined as follows:

$$L_s(n)=F_sL_s(n-1)+(1-F_s) \quad (12)$$

The long term characterization of the driving style $L_s$ adapts slowly to driver's style and summarizes its major preferences over long period of time.

M3) Determine short term characterization of the driving style. There are situations even where the most fuel economy conscious drivers may want to sacrifice fuel economy improvements temporarily. For example, if a driver is merging or passing another vehicle, he or she may want to temporarily sacrifice fuel economy improvement to gain extra vehicle performance. Under such conditions, the driver may not want the feedback (haptic or visual) to be intrusive. Hence, a short term characterization of the driving style is used and a fast forgetting factor parameter that can be used to temporarily desensitize or reduce the system effectiveness for fuel economy improvement to achieve extra (more than usual desired by the driver) vehicle performance or acceleration. This short term characterization for temporary increased performance at the cost of reduced fuel efficiency is determined as follows:

M3-a) When the accelerator pedal position, $A_{pp}$, is greater than the $A_{th}$, the fast forgetting factor, $F_f$, is determined as follows:

$$F_f=F_{fp}, \quad (13)$$

where $F_{fp}$ is the fast forgetting factor value when the accelerator pedal position, $A_{pp}$, is greater than $A_{th}$.

M3-b) When the accelerator pedal position, $A_{pp}$, is less or equal to the $A_{th}$, the fast forgetting factor, $F_f$, is determined as follows:

$$F_f=F_{fnw}, \quad (14)$$

where $F_{fnw}$ is the fast forgetting factor value (to wait before quickly forgetting the impact of the temporary condition) when the accelerator pedal position, $A_{pp}$, is less or equal than $A_{th}$.

M3-c) When the accelerator pedal position, $A_{pp}$, is less or equal to the $A_{th}$, and the accelerator pedal position, $A_{pp}$, is greater than the $A_{th}$, the fast forgetting factor, $F_f$, is determined as follows:

$$F_f=F_{fnq}, \quad (15)$$

where $F_{fnq}$ is the fast forgetting factor value (which results in quickly forgetting the impact of the temporary condition) when the accelerator pedal position, $A_{pp}$, is less or equal than $A_{th}$.

M3-d) When the accelerator pedal position, $A_{pp}$, is less or equal to the $A_{th}$, then the short term characterization of the driving style, $L_f$, is determined as follows:

$$L_f(n)=F_fL_f(n-1). \quad (16)$$

M3-e) When the accelerator pedal position, $A_{pp}$, is greater than the $A_{th}$, then the short term characterization of the driving style, $L_f$, is determined as follows:

$$L_f(n)=F_fL_f(n-1)+(1-F_f). \quad (17)$$

The short term characterization of the driving style, $L_f$, learns and adapts quickly to a driver's temporary intent to change his or her driving style due to non-ordinary conditions or desires, and tries to suppress the feedback for improving his or her driving behavior under such conditions. Thereby, the haptic or visual feedback will not be intrusive at all to the driver's temporary intents to increase performance at the cost of reducing fuel economy.

M4) Determine the Overall Aggregated characterization of the driving style. The final aggregated driver style characterization, is determined by the product type aggregation of the long and short term characterization as follows:

$$L_{adpt}(n)=L_f(n)L_s(n) \quad (18)$$

This aggregated category, $L_{adpt}$, is adapted iteratively, and is multiplied by the fuzzy input signal, the normalized fuel consumption ($fc_n$). Therefore, the input of the normalized fuel consumption to the fuzzy fuel consumption membership function in the multiple-input, multiple-output fuzzy logic based real-time advisory system is modified by this learned parameter, which adapts the behavior of the real-time advisory system according to the estimated driving style. In addition, it also modifies the behavior of the real-time advisory controller to accommodate temporary (or short-term) conditions where the importance of fuel economy improvement is superseded by the desire of increased performance.

In this way the multiple-input, multiple-output rule base with a fuzzy reasoning mechanism in the real-time advisory system, which decomposes the space of the main factors that affect vehicle fuel economy and performance (instantaneous fuel consumption, acceleration, speed, and accelerator pedal position), can be learned or adapted to the specific driver style and behavior.

The fuzzy advisory controller can effectively be tuned to provide feedback to the driver such that the fuel economy of the vehicle can be improved in a real world driving environment. However, different types of drivers may find or perceive the feedback differently. Even with the potential for increasing fuel economy, this feedback or advice, which results in reduced performance can be unacceptable to some group of drivers. Similarly, another group of drivers may consider this feedback to be too soft or below their expectations for their driving style and preferences for fuel economy improvement, and hence may desire more feedback or advice from the system to further improve their vehicle's fuel economies. Alternatively, some group of drivers may consider this feedback to fit well to their driving style and preferences for fuel economy versus desired performance. Finally, even for the same driver, the preference for fuel economy versus performance might be different under different circumstances. Hence, an adaptive algorithm that can learn driver intentions by monitoring their driving style and behavior can be used to address these issues.

The adaptation algorithm uses the estimated driver characterization to dynamically adapt the parameters of the fuzzy advisory controller to the specific driver and improve its effectiveness. As explained previously in the preceding discussion, the adaptation algorithm continually monitors the reaction of the driver to the recommendation of the advisory system (haptic or visual) and estimates driver preferences for performance and fuel economy. The main idea behind the adaptation algorithm is that if the feedback mechanism is not of the driver's desire, his or her accelerator response or behavior will indicate this fact. Hence, the control information in the current driver response can be used to learn a parameter that reflects the type of performance and fuel economy trade-off desired by the driver. In this way, the driver's desire for performance and fuel economy trade-off can be converged into a learned factor over time, which would then be used for gain scheduling of the fuzzy advisory controller. In other words, the proposed adaptation algorithm continually learns the driver's acceptance or rejection of the advice issued by the fuzzy advisory controller and adapts it to the driver's desired behavior over time.

Since the rule based fuzzy algorithm provides advice that can either be accepted or rejected by the driver, we can categorize the driving style into two categories for this algorithm. In the first category, the advice from the controller is accepted which represents the desire from the driver to improve fuel economy. Therefore, this category can be associated with fuel efficiency aware style of driving. The second category is associated with a driver who rejects or ignores the advice from the advisory system. It can be noted here that the driving style, rather than the driver, is characterized because driving style encompasses specific driver and vehicle environment goals such as driving conditions, load, driver's cognitive/emotional state, etc., which may cause a certain driver to exhibit different driving styles under different circumstances.

The acceptance or rejection of the advisory system recommendations can be quantified through their frequencies. Since the acceptance/rejection events are complementary, it is enough to calculate the frequency of occurrence of one of them, e.g. the rejection events. Numerically, the process of recursive calculation of the weighted frequency of rejection (with higher weights corresponding to the recent observations) can be accomplished by applying a low pass filter implementing the exponential smoothing algorithm:

$$L(n)=\phi L(n-1)+(1-\phi)1 \text{ if } A_{pp}>A_{th} \quad (19)$$

$$L(n)=\phi L(n-1) \text{ otherwise} \quad (20)$$

where the constant forgetting factor, $0<\phi\leq1$, controls the rate of updating the weighted mean L of the events of rejecting the system advice, i.e. $A_{pp}>A_{th}$. For a constant forgetting factor $\phi$, we obtain a vector of positive weights can be obtained with unit sum as follows:

$$W=[\phi^n(1-\phi)\phi^{n-1}(1-\phi)\phi^{n-2}\ldots(1-\phi)] \quad (21)$$

The vector W delineates a weighted average type aggregating operator with exponentially decreasing weights that are parameterized by the forgetting factor $\phi$. Parameter $\phi$ defines the memory depth (the length of the moving window) of the weighted averaging aggregating operator. It can be shown that the memory depth $K_\phi$ is approximately a reciprocal of the forgetting factor, i.e. $K_\phi=1/(1-\phi)$. Weighted average is calculated over the events with indexes belonging to the soft interval: $s\in\{n-K_\phi+1,n\}$; where symbol { indicates a soft lower bound that includes values with lower indexes than $(n-K_\phi)$ with relatively low contribution.

By manipulating the forgetting factor or making it dependent on certain conditions, the moving window length is essentially changed, and a long or short term rejection categorization of the driver's preferences is obtained.

For different values of the forgetting factor ($\phi$), different characterizations (long term or short term) of the driver style are learned. This simplification, however, has an impact on the accuracy of the learned information about the driver; e.g., small and large values of $dA=A_{th}-A_{pp}$ are interpreted identically in (19) and (20).

Incorporating slow and fast forgetting factors in equations (19) and (20) can be used to learn both long term and short term driver behaviors, respectively. Slow forgetting factor ($\phi_s=0.95$) is used to provide a long term characterization of the driving style over a longer time (21):

$$L_s(n)=\phi_s L(n-1)+(1-\phi_s)1 \text{ if } A_{pp}>A_{th} \quad (22)$$

$$L_s(n)=\phi_s L(n-1) \text{ otherwise} \quad (23)$$

There are situations even where the most fuel economy conscious drivers may want to sacrifice or disregard importance of fuel economy improvements temporarily. For example, if a driver is merging or passing another vehicle, he or she may want to temporarily sacrifice fuel economy improvement to gain extra vehicle performance. Under such conditions, the driver may not want the feedback (haptic or visual) to be intrusive. Hence, a short term characterization of the driving style and a fast forgetting factor are used:

$$L_f(n)=\phi_f L(n-1)+(1-\phi_f)1 \text{ if } A_{pp}>A_{th} \quad (24)$$

$$L_f(n)=\phi_f L(n-1) \text{ otherwise}, \quad (25)$$

where $\phi_f$ is the fast forgetting factor value ($\phi_s=0.8$) to provide an alternative measure of the instantaneous preferences of the driver. The overall aggregated driver style characterization is determined by the product type aggregation of the long and short term characterization as follows:

$$L_{adpt}(n)=L_f(n)L_s(n) \quad (26)$$

This aggregated characterization value, $L_{adpt}$, is used for gain scheduling of the advisory controller. The gain scheduling is performed by multiplying (scaling) the input $x_4$, the normalized fuel consumption ($fc_n$), by the current aggregated characterization value $L_{adpt}$. The impact of this dynamic rescaling of the normalized fuel consumption $fc_n$ is the adaptation of the membership function value $F_{4,\,j_4}$ ($L_{adapt}x_4$) in expression (15) to the rate of rejection of the system recommended accelerated pedal position threshold $A_{th}$; i.e., the estimated driving style. Consequently, this results in the adaptation of the aggregated membership value from the antecedents of the rules and the output inferred by the fuzzy controller as follows:

$$y = \frac{\sum_j F_{1,j_1}(x_1) F_{2,j_2}(x_2) F_{3,j_3}(x_3)}{\sum_j F_{1,j_1}(x_1) F_{2,j_2}(x_2) F_{3,j_3}(x_3) F_{4,j_4}(L_{adapt}x_4)} \quad (27)$$

It is clear that this learned parameter modifies the behavior of the real-time advisory controller to accommodate temporary (or short term) conditions where the importance of fuel economy improvement is superseded by the desire of increased performance.

Figure 4:
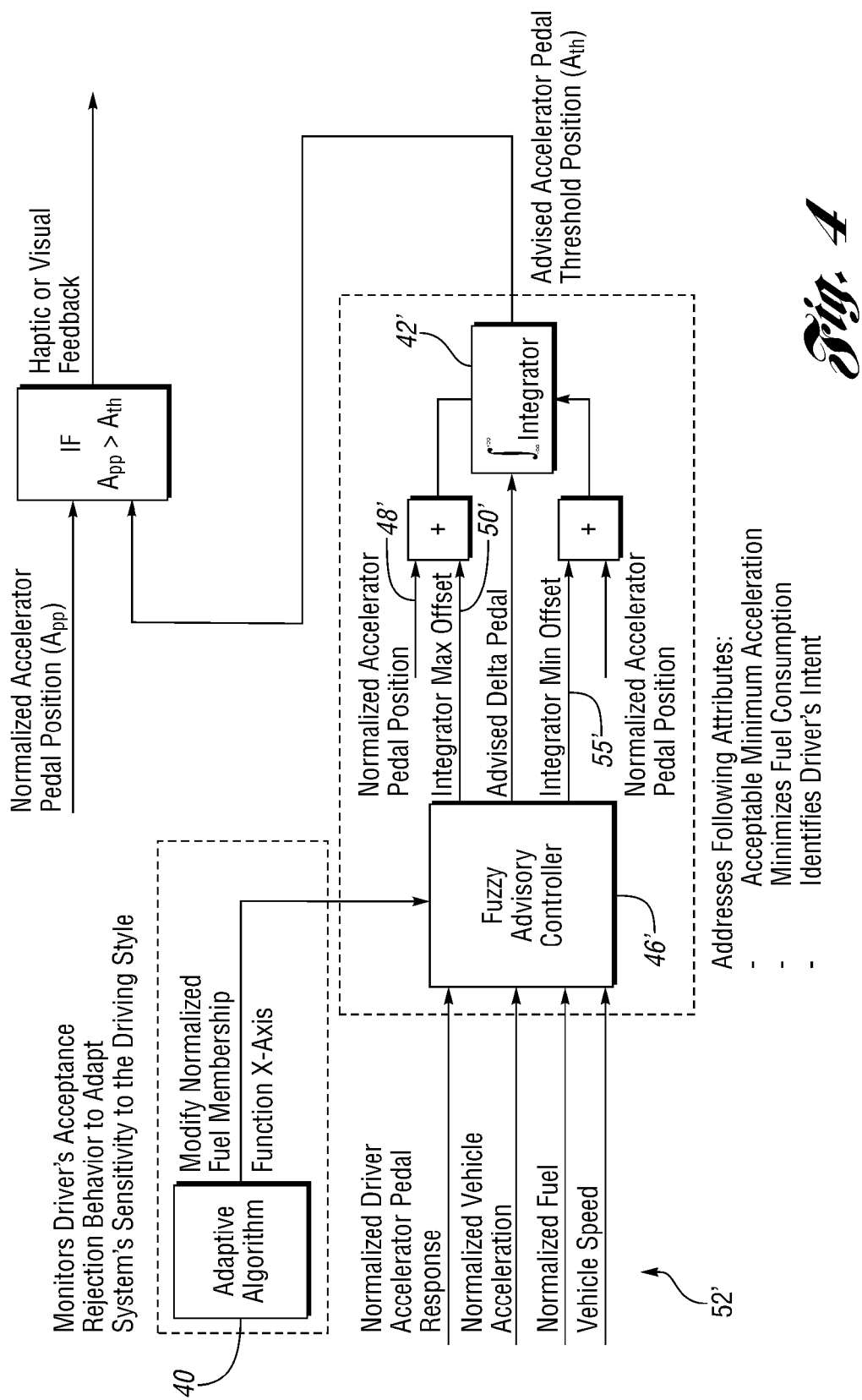
FIG. 4 is a schematic block diagram of an adaptive real-time advisory control system showing an adaptive algorithm used to convert a driver behavior effect as an input to a fuzzy advisory controller.

FIG. 4 shows the adaptive algorithm at 40 that is used to convert a driver's behavior effect to provide an input to the fuzzy advisory controller. Other components of the diagram of FIG. 4 carry the same numerals used in FIG. 2 for corresponding components, although prime notations are added to the numerals in FIG. 4.

In the design of FIG. 4, the fuzzy rule-based driver advisory controller, input variables, output variables, and the associated fuzzy rule sets are defined. Two of the inputs are fuel economy error and rate of change of fuel economy error. In addition to these inputs, a third input is engine power. These inputs only convey the effect on overall fuel economy in an HEV without taking into account drivability and intrusiveness for the driver. Also, these inputs can only provide a nonlinear fuzzy logic based control that is completely feedback-based and cannot take predictability nor opportunistic conditions into account to improve fuel economy without affecting the drivability.

To take drivability into account, the essence of prediction and an ability to take advantage of opportunistic states is important. One of the inputs, shown at 52, used in the diagram of FIG. 2 is fuel economy, which is calculated as a fraction of vehicle speed to fuel consumption. Since vehicle speed is a good indicator of vehicle driving state (city type or highway driving), it is more relevant to use fuel consumption and vehicle speed as inputs instead of just fuel economy. Hence, the two new inputs that are used to achieve improved fuel economy and drivability were the normalized fuel consumption ($fc_n$) and vehicle speed (vs). The normalized fuel consumption is the ratio between the instantaneous or actual fuel consumption and the maximum fuel consumption during a given driving condition.

To address the criteria for acceptable drivability or performance, the vehicle should be able to achieve minimum acceptable acceleration at all times. Hence, one of the other inputs that is needed is the normalized vehicle acceleration ($a_n$), the ratio between the instantaneous or actual vehicle acceleration and the maximum possible vehicle acceleration during a given driving condition.

To predict driver behavior and to make use of opportunistic states of the driving behavior, the driver pedal response ($\zeta_{\Delta A}$), which is the difference between the actual pedal position and appropriately filtered pedal position, was also selected as an input as shown at 52.

One of the outputs of the improved controller is the advised change (delta) at 53 of the accelerator pedal position ($\Delta A_{u\_lim}$) together with two other outputs, the maximum integrator offset 50 ($I_{oft\_max}$) and the minimum integrator offset 55 ($I_{oft\_min}$) resulting in a multi-input multi-output (MIMO) advanced fuzzy controller. The advised change of accelerator pedal position from this controller is fed into an integrator 42 whose lower and upper bounds are calculated based on actual pedal position 48 and minimum integral offset, and actual pedal position and maximum integral offset 50, as shown in FIG. 3. This advanced fuzzy controller of FIG. 3 utilizes the human control knowledge and experience from the usage and testing of fuzzy advisory controller to intuitively construct a more sophisticated intelligent controller so that the resulting controller will emulate the desired control behavior to a certain extent. FIG. 2 shows the fuzzy advisory controller at 46.

The design characteristics of the MIMO (multiple input/multiple output) fuzzy rule-based driver advisory controller is as follows: 1) the input variables consist of driver accelerator pedal response (($\zeta_{\Delta A}$), vehicle speed (vs), normalized vehicle acceleration ($a_n$), and normalized fuel consumption ($fc_n$); 2) the output variables consist of advised change of the pedal position ($\Delta A_{u\_lim}$), maximum integrator offset ($I_{oft\_max}$), and minimum integrator offset ($I_{oft\_min}$); 3) the input fuzzy sets or membership functions are chosen to be low and high trapezoidal functions, where $b_{1L}$, b, $b_{3L}$, $b_{4L}$ represents the low value of the trapezoidal functions; and 4) the three output fuzzy sets are of singleton type for the advised change of (delta) accelerator pedal position, maximum integrator offset, and minimum integrator offset. The output fuzzy sets for maximum integrator offset are of singleton type representing high ($h_{2H}$), low ($h_{2L}$) and zero ($h_{2z}$) values. Similarly, the output fuzzy sets for minimum integrator offset are of singleton type representing negative high (–High or $-h_{3H}$), negative low (–Low or $-h_{3H}$) and zero ($h_{3Z}$) values. Finally, the output fuzzy sets for advised change of accelerator pedal position is of singleton type representing high ($h_{1H}$), low ($h_{1L}$) and negative high (–High or $-h_{1H}$) values. The fuzzy rules for this controller are described above in Table 1.

The rules in Table 1 exemplify different HEV conditions, such as steady state and transient, together with feedback-based corrective, opportunistic and predictive conditions. These conditions are defined by the rule antecedents and the corresponding recommended changes of the upper limit of the accelerator pedal as consequents. These rules are laid out so that they describe and address various different driving conditions where fuel efficiency can be improved and acceptable vehicle performance can be achieved.

As mentioned above, the fuzzy rules are laid out in a manner such that they can distinguish between various HEV driving behaviors and make opportunistic, predictive or corrective decisions. Among these fuzzy rules, some of the rules are intended to cover steady state and others will cover transient conditions. In addition, these fuzzy rules cover conditions where a fast or slow corrective action is required to improve fuel economy of the vehicle. Also some of the other fuzzy rules provide the ability for the controller to anticipate conditions where the controller may detect a condition of inefficient fuel consumption due to some environmental factor and will set its outputs appropriately to look for opportunities to indicate driver to improve driving behavior. In addition, some of the other rules look at the current conditions where current fuel consumption is low, but due to driver behavior they can predict that fuel economy will degrade in near future and hence can take predictive actions to provide a mechanism to avoid possible undesirable behaviors.

For example, Rule 8, where $x_1(n)$ is low, but $x_2(n)$, $x_3(n)$ and $x_4(n)$ are all high, depicts an almost steady state condition where vehicle acceleration and fuel consumption is high, so there is a need to take fast corrective action by indicating to driver that he/she needs to slow down by scheduling a negative high value $(-h_{1H})$ for the first output ($y_1(n)$ or $\Delta A_{u\_lim}$), zero ($h_{2Z}$) for the second output ($y_2(n)$ or $I_{oft\_max}$) and negative high $(-h_{3H})$ for the third output ($y_3(n)$ or $I_{oft\_min}$).

Rule 6, where $x_1(n)$ is low, $x_2(n)$ is high, and $x_3(n)$ is low and $x_4(n)$ is high indicates an opportunistic condition where the system is in a steady state condition and fuel consumption is high, so the controller needs to indicate that driving style is fine but at the same time it needs to prepare to look for opportunity to improve fuel consumption by scheduling a low value ($h_{1L}$) for the first output ($y_1(n)$ or $\Delta A_{u\_lim}$), low value ($h_{2L}$) for the second output ($y_2(n)$ or $I_{oft\_max}$) and zero ($h_{3Z}$) for the third output ($y_3(n)$ or $I_{oft\_min}$).

Rule 9, where $x_1(n)$ is high, but $x_2(n)$, $x_3(n)$ and $x_4(n)$ are all low, indicates a predictive condition where current fuel consumption and acceleration conditions are fine, but due to the faster driver response, the controller needs to take predictive actions to prepare for any upcoming inefficiency in fuel consumption by scheduling a negative low value $(-h_{1L})$ for the first output ($y_1(n)$ or $\Delta A_{u\_lim}$), high value ($h_{2H}$) for the second output ($y_2(n)$ or $I_{oft\_max}$) and zero ($h_{3Z}$) for the third output ($y_3(n)$ or $I_{oft\_min}$).

In summary, these rules provide a method to schedule appropriate outputs for the advanced MIMO fuzzy advisory controller according to the powertrain conditions.

Although a particular embodiment of the invention is disclosed, a person skilled in the art may make modifications without departing from the invention. All such modifications are intended to be within the scope of the following claims. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle having an accelerator pedal and a controller in communication with the accelerator pedal, comprising:
generating a signal using a logic-based algorithm executed by the controller indicating an advisory accelerator pedal position based on a driver's previous acceptance or rejection of previous driver advisory information in similar vehicle operating conditions;
calculating a forgetting factor value; and
adjusting the forgetting factor value such that the controller learns a driving style based on operating parameters during either a long operating period or a short operating period, wherein the controller applies a fast forgetting factor during a second short operating period of increased vehicle performance to reduce intrusiveness of advisory accelerator pedal positions during a second long operating period.

2. The method of claim 1 further comprising normalizing a variable parameter indicative of the driver's previous acceptance and rejection of previous driver advisory information.

3. The method of claim 1 further comprising normalizing current vehicle operating parameters including vehicle acceleration, vehicle speed, and vehicle fuel consumption.

4. The method of claim 1 wherein the driver's acceptance and rejection of previous driver advisory information corresponds to a change in accelerator pedal position in response to the advisory accelerator pedal position.

5. The method of claim 1 wherein the logic-based algorithm uses fuzzy logic, the method further comprising:
adapting parameters of fuzzy logic rules to each of multiple sets of vehicle driving conditions to provide the advisory accelerator pedal position to conform driving style to current driving conditions.

6. The method of claim 1 further comprising:
storing frequency of a driver's acceptance and rejection of the advisory accelerator pedal position in the controller.

7. The method of claim 1, wherein the logic-based algorithm includes fuzzy rules with inputs based on fuel economy error between actual fuel economy and optimal fuel economy, and rate of change of the fuel economy error.

8. The method of claim 7 wherein the fuzzy rules include inputs based on input power from a mechanical power source.

9. The method of claim 7 wherein the fuzzy rules includes a first set of fuzzy rules governing steady state vehicle operating conditions and a second set of fuzzy rules governing transient operating conditions.

10. A method for controlling a vehicle comprising:
adjusting a calculated forgetting factor value such that a controller in communication with an accelerator pedal learns a driving style based on operating parameters during either a long operating period or a short operating period, wherein the controller applies a fast forgetting factor during a second short operating period of increased vehicle performance to reduce intrusiveness of advisory accelerator pedal position signals during a second long operating period.

11. The method of claim 10 further comprising normalizing a variable parameter indicative of a driver's previous acceptance and rejection of previous driver advisory information.

12. The method of claim 11 wherein the driver's acceptance and rejection of previous driver advisory information corresponds to a change in accelerator pedal position in response to the advisory accelerator pedal position.

13. The method of claim 10 further comprising normalizing current vehicle operating parameters including vehicle acceleration, vehicle speed, and vehicle fuel consumption.

14. The method of claim 10 further comprising:
storing frequency of a driver's acceptance and rejection of the advisory accelerator pedal position in the controller.

* * * * *